United States Patent
Kambayashi et al.

(10) Patent No.: US 11,722,075 B2
(45) Date of Patent: Aug. 8, 2023

(54) ULTRASONIC MOTOR WITH STABILIZED STATOR VIBRATION

(71) Applicant: Murata Manufacturing Co., Ltd., Nagaokakyo (JP)

(72) Inventors: Tsuguji Kambayashi, Nagaokakyo (JP); Toshiaki Yamashita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/661,439

(22) Filed: Apr. 29, 2022

(65) Prior Publication Data

US 2022/0263433 A1    Aug. 18, 2022

Related U.S. Application Data

(63) Continuation of application No. PCT/JP2020/040663, filed on Oct. 29, 2020.

(30) Foreign Application Priority Data

Nov. 15, 2019   (JP) .................................. 2019-206728

(51) Int. Cl.
    *H02N 2/16*    (2006.01)
(52) U.S. Cl.
    CPC .................................. *H02N 2/163* (2013.01)
(58) Field of Classification Search
    CPC ....... H02N 2/163; H02N 2/0085; H02N 2/166
    See application file for complete search history.

(56) References Cited

U.S. PATENT DOCUMENTS

| | | | |
|---|---|---|---|
| 7,608,981 B2 * | 10/2009 | Unno | H02N 2/166 |
| | | | 29/25.35 |
| 2011/0215675 A1 | 9/2011 | Asano | |

FOREIGN PATENT DOCUMENTS

| | | |
|---|---|---|
| JP | H7122863 A | 5/1995 |
| JP | H10146071 A | 5/1998 |
| JP | 2002142473 A | 5/2002 |
| JP | 2007185049 A | 7/2007 |
| JP | 2009207254 A | 9/2009 |
| JP | 2009238342 A | 10/2009 |
| WO | 2010061508 A1 | 6/2010 |

OTHER PUBLICATIONS

International Search Report in PCT/JP2020/040663, dated Jan. 12, 2021, 3 pages.

\* cited by examiner

*Primary Examiner* — Emily P Pham
(74) *Attorney, Agent, or Firm* — ArentFox Schiff LLP

(57) ABSTRACT

An ultrasonic motor is provided that includes a stator including first and second piezoelectric elements provided on a first main surface of a vibrator having a plate shape, a rotor in direct or indirect contact with a second main surface of the vibrator, and a wiring member connected to the first and second piezoelectric elements. Moreover, the wiring member includes first and second connection members connected to the first and second piezoelectric elements, a central wiring portion connected to the first and second connection members and provided in a region including a center of an axial direction, and an extended wiring portion connected to the central wiring portion. The central wiring portion is fixed to the first main surface of the vibrator and the extended wiring portion is lifted from the first main surface of the vibrator.

20 Claims, 14 Drawing Sheets

US 11,722,075 B2

ULTRASONIC MOTOR WITH STABILIZED STATOR VIBRATION

CROSS REFERENCE TO RELATED APPLICATIONS

This application is a continuation of PCT Application No. PCT/JP2020/040663, filed Oct. 29, 2020, which claims priority to Japanese Patent Application No. 2019-206728, filed Nov. 15, 2019, the entire contents of each of which are hereby incorporated in their entirety.

TECHNICAL FIELD

The present invention relates to an ultrasonic motor including a plurality of piezoelectric elements.

BACKGROUND

Conventionally, there are various ultrasonic motors that vibrate a stator by a piezoelectric element. For example, Japanese Patent Application Laid-Open No. 2007-185049 (hereinafter "Patent Document 1") describes a piezoelectric element that is attached to one surface of a stator. In order to transmit an electric signal to the piezoelectric element, a flexible wiring member is bonded to the piezoelectric element. Moreover, the wiring member is physically fixed to the stator at an end of the stator and is extended out of the stator.

In an ultrasonic motor, a stator is repeatedly vibrated by a piezoelectric element being excited. In a conventional ultrasonic motor as described in Patent Document 1, although a flexible wiring member is used, the wiring member is fixed to an end of a stator. Therefore, at a portion where the wiring member is fixed, disconnection or noise may occur due to the repeated vibration. In addition, vibration may leak and the characteristics of a motor may be deteriorated.

SUMMARY OF THE INVENTION

Accordingly, it is an object of the present invention to provide an ultrasonic motor that hardly causes disconnection or noise of wiring and is configured to stabilize vibration of a stator.

Thus, an ultrasonic motor according to an exemplary embodiment includes a stator including a vibrator including a first main surface and a second main surface that face each other. Moreover, the vibrator has a plate shape and a first piezoelectric element and a second piezoelectric element are provided on the first main surface of the vibrator. The ultrasonic motor also includes a rotor in direct or indirect contact with the second main surface of the vibrator; and a wiring member connected to the first piezoelectric element and the second piezoelectric element. In this aspect, when a direction that connects the first main surface and the second main surface of the vibrator and is along a rotation center is set as an axial direction, the first piezoelectric element and the second piezoelectric element are arranged along a circumferential direction of a traveling wave circulating around the axial direction so that the traveling wave is generated by the vibrator being vibrated. Furthermore, the wiring member includes a first connection member and a second connection member connected to the first piezoelectric element and the second piezoelectric element, respectively, a central wiring portion is connected to the first connection member and the second connection member and provided in a region including a center of the axial direction, and an extended wiring portion is connected to the central wiring portion. The central wiring portion is fixed to the first main surface of the vibrator, and the extended wiring portion is lifted from the first main surface of the vibrator.

In an ultrasonic motor according to the exemplary embodiment of the present invention, disconnection and noise in a wiring member hardly occur, the stability of vibration of a stator is enhanced, and the characteristics of a motor do not deteriorated.

DETAILED DESCRIPTION

Hereinafter, the present invention will be clarified by exemplary embodiments of the present invention being described with reference to the drawings.

It is noted that each of the embodiments described in the present specification is exemplary, and replacement or combination of some parts of configurations is possible between different embodiments.

Figure 1:
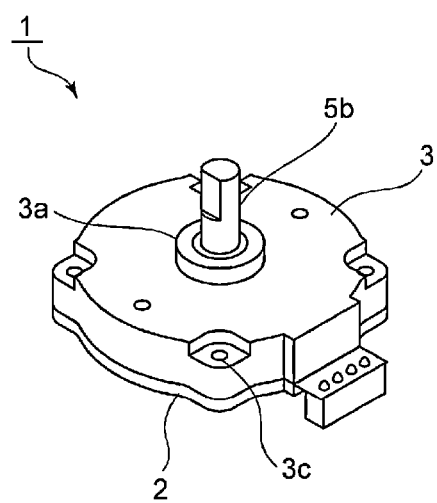
FIG. 1 is a perspective view of an ultrasonic motor according to a first exemplary embodiment.
Figure 2:
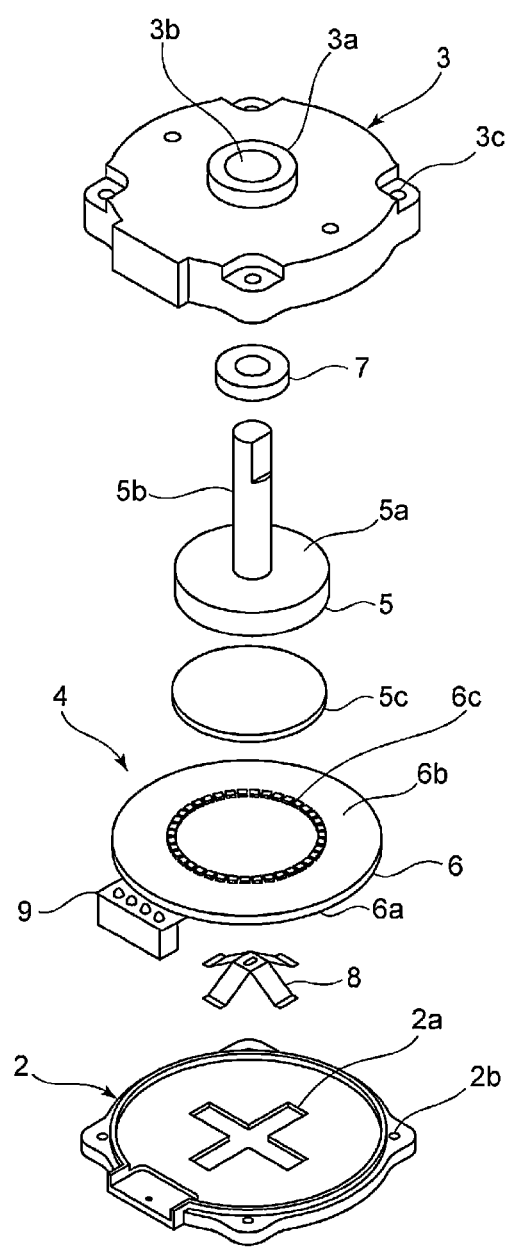
FIG. 2 is an exploded perspective view of the ultrasonic motor according to the first exemplary embodiment.
Figure 3:
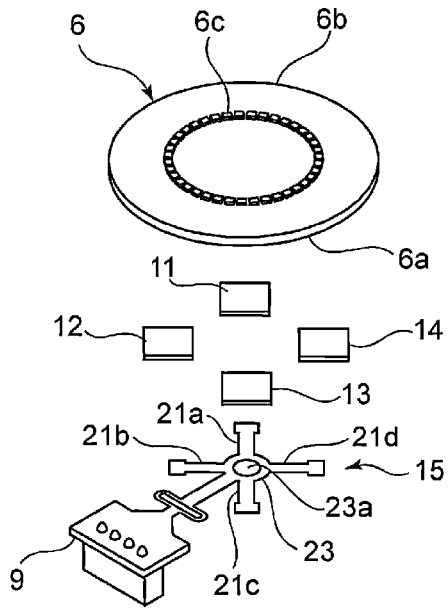
FIG. 3 is an exploded perspective view used for describing relation among a vibrator, piezoelectric elements, and a wiring member in the ultrasonic motor according to the first exemplary embodiment.

FIG. 1 is a perspective view of an ultrasonic motor according to a first exemplary embodiment, FIG. 2 is an exploded perspective view thereof, and FIG. 3 is an exploded perspective view illustrating a stator and a wiring member.

As shown, the ultrasonic motor 1 includes a first case member 2 and a second case member 3. The second case member 3 is fixed to the first case member 2, whereby a case of the ultrasonic motor 1 is formed. A stator 4 and a rotor 5 are housed in the housing space of the case. The stator 4 includes a vibrator 6 formed from a metal plate and has a disk shape, although it is notes that the shape is not particularly limited thereto. Moreover, the vibrator 6 can be formed from material other than metal in alternative aspects.

The vibrator 6 includes a first main surface 6a and a second main surface 6b. The first main surface 6a and the second main surface 6b face each other. To the first main surface 6a of the vibrator 6, first to fourth piezoelectric elements 11 to 14 illustrated in FIG. 3 are fixed. The planar shapes of the first to fourth piezoelectric elements 11 to 14 are not particularly limited, and may be elliptical, for example. The first to fourth piezoelectric elements 11 to 14 are connected to a connector 9 with a wiring member 15 interposed therebetween.

It is noted that, although the first to fourth piezoelectric elements 11 to 14 are provided in the present embodiment, the stator in the ultrasonic motor of the present invention is only required to include at least the first piezoelectric element 11 and the second piezoelectric element 12. In order to generate a traveling wave to be described below, any number of two or more piezoelectric elements can be used in various exemplary aspects. Therefore, in addition to the first and second piezoelectric elements 11 and 12, the third and fourth piezoelectric elements 13 and 14 can be used as at least one other piezoelectric element, for example.

On the second main surface 6b of the vibrator 6, a plurality of protrusions 6c is provided. The plurality of the protrusions 6c is provided annularly. The plurality of the protrusions 6c is brought into pressure contact with friction material 5c attached to a surface of the rotor 5. In the ultrasonic motor 1, the first to fourth piezoelectric elements 11 to 14 are excited so that a traveling wave traveling in the circumferential direction is generated in the vibrator 6. The rotor 5 is rotated by the traveling wave in operation. It is generally noted that, in the present disclosure, pressure contact refers to contact obtained by applying pressure, that is, pressing.

Figure 4A:
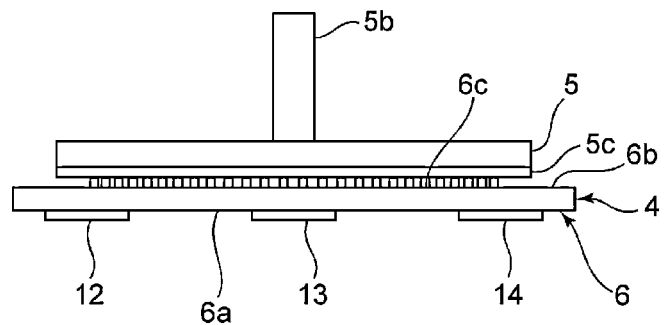
FIG. 4(a) is a front view used for describing a portion where a stator and a rotor of the ultrasonic motor of the first exemplary embodiment are laminated.

As illustrated in FIG. 4(a), the rotor 5 is in indirect contact with the second main surface 6b of the vibrator 6 with the friction material 5c interposed therebetween. However, the friction material 5c may not be used in other exemplary aspects. That is, the rotor 5 can be in direct contact with the second main surface 6b of the vibrator 6.

Figure 4B:
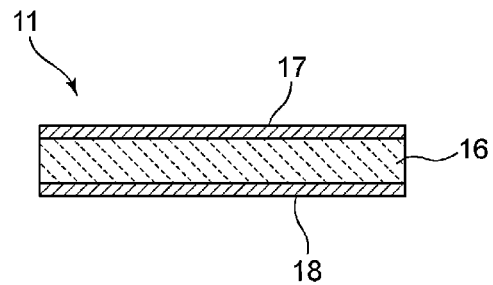
FIG. 4(b) is a front sectional view illustrating details of a piezoelectric element.

As illustrated in FIG. 4(b), the first piezoelectric element 11 has structure in which electrodes 17 and 18 are provided on respective main surfaces of a piezoelectric ceramic layer 16. The electrode 17 is attached to the first main surface 6a of the vibrator 6 using an adhesive, which has a thickness that is very thin. Therefore, the electrode 17 is electrically connected to the vibrator 6. It is noted that the second to fourth piezoelectric elements 12 to 14 also have similar structure.

A feature of the present embodiment is a portion of the wiring member 15 extended from the vibrator 6 to the connector 9. This will be described with reference to FIGS. 5(a), 5(b), and 6.

Figure 5A:
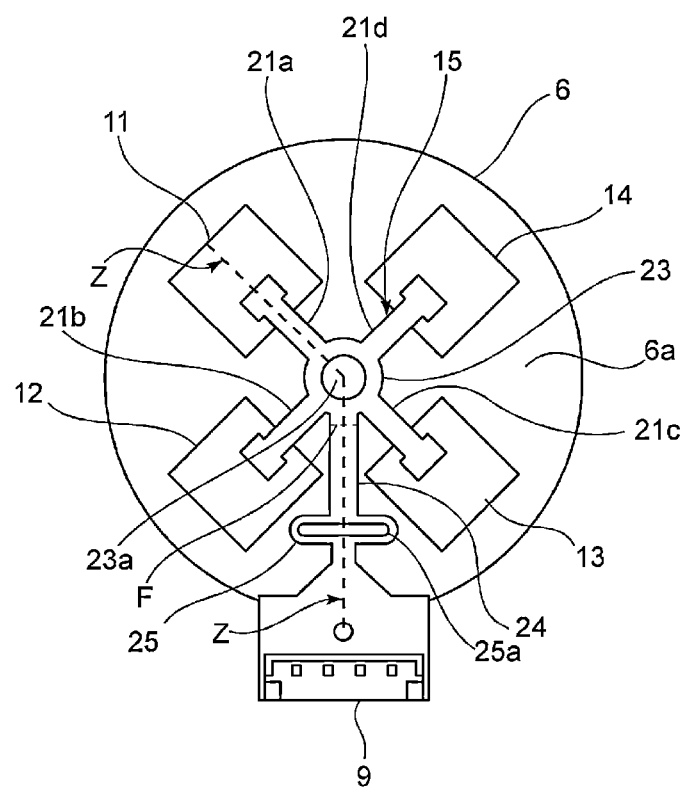
FIG. 5(a) is a plan view used for describing structure of a first main surface of the vibrator and the wiring member in the ultrasonic motor according to the first exemplary embodiment.

As illustrated in FIG. 5(a), the first to fourth piezoelectric elements 11 to 14 are attached to the first main surface 6a of the vibrator 6 as described above. The wiring member 15 includes first to fourth connection members 21a to 21d connected to the first to fourth piezoelectric elements 11 to 14, a central wiring portion 23, and an extended wiring portion 24.

The central wiring portion 23 is provided in a region including the center of the axial direction that is the above-described rotation center of the first main surface 6a of the vibrator 6. Although the central wiring portion 23 is provided in a region including the center of the first main surface 6a of the disk-shaped vibrator 6 in the present embodiment, the central wiring portion can be provided at a position that is deviated from the center of the vibrator depending on the planar shape of the vibrator in an alternative aspect. That is, the central wiring portion can be provided in a region not including the center of the first main surface of the vibrator as long as the region includes the center of the axial direction that is the rotation center.

As described above, in the present invention, two or more piezoelectric elements can be used. Therefore, in addition to the first and second connection members 21a and 21b, at least one other connection member, for example, the third and fourth connection members 21c and 21d can be provided.

Figure 6:
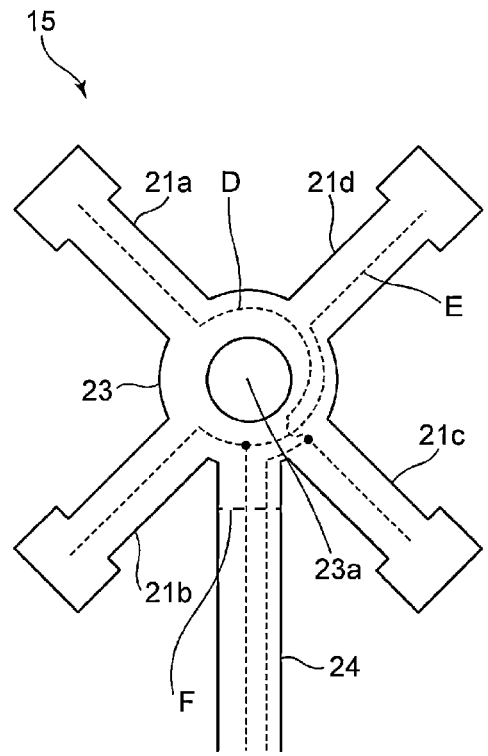
FIG. 6 is a plan view used for describing first and second signal wiring provided in the wiring member.

A first signal is applied to the first and third piezoelectric elements 11 and 13 that face each other. On the other hand, a second signal obtained by inverting a phase of the first signal is applied to the second and fourth piezoelectric elements 12 and 14. The wiring member 15 includes a substrate formed from flexible resin such as polyimide, and signal wiring laminated on or embedded in the substrate. The signal wiring is formed from metal foil such as Cu foil or another conductive material. In FIG. 6, first and second signal wiring D and E is indicated using broken lines.

The first signal wiring D passes through the first and third connection members 21a and 21c, the central wiring portion 23, and the extended wiring portion 24. On the other hand, the second signal wiring E passes through the second and fourth connection members 21b and 21d, the central wiring portion 23, and the extended wiring portion 24.

The first to fourth connection members 21a to 21d of the above wiring member 15 are bonded to electrodes on the outer sides of the first and third piezoelectric elements 11 and 13 or the second and fourth piezoelectric elements 12 and 14, and the other ends are connected to the central wiring portion 23. The central wiring portion 23 is fixed to the first main surface 6a of the vibrator 6 using an adhesive. As illustrated in FIG. 5(a), the first to fourth connection members 21a to 21d are radially extended from the central wiring portion 23 toward the outer peripheral edge of the vibrator 6. However, it is noted that in the exemplary embodiment, the number of the piezoelectric elements is not limited to four, and can be two or any number of three or more. When two piezoelectric elements are used, the first and second connection members are extended from the central wiring portion toward the outer peripheral edge of the vibrator, and the angle formed by the first connection member and the second connection member is 180°. In order to achieve a function of a traveling wave annular motor, 4n piezoelectric elements are required, where n is an integer.

Figure 5B:
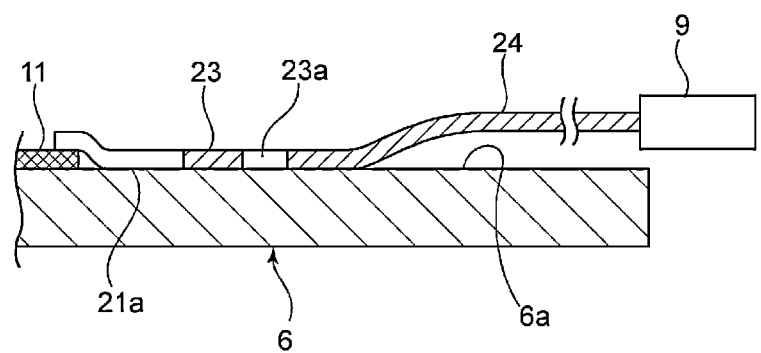
FIG. 5(b) is a sectional view taken along line Z-Z in FIG. 5(a), and is a front sectional view obtained by notching a part used for describing relation between a central wiring portion and an extended wiring portion, and the vibrator.

The extended wiring portion 24 of the wiring member 15 is portions on the outer sides of the broken lines F in FIG. 5(a) and FIG. 6. As illustrated in FIG. 5(b), the extended wiring portion 24 is lifted from the first main surface 6a of the vibrator 6.

In the middle of the extended wiring portion 24, a stress absorbing portion 25 is provided. The stress absorbing portion 25 is formed such that a part of the extended wiring portion 24 is branched and joined on the outer side of a through hole 25a. The stress absorbing portion 25 is constructed to alleviate tensile stress applied to the extended wiring portion 24. Accordingly, leakage of vibration can be more effectively reduced or prevented. It is also noted that the shape of the stress absorbing portion 25 is not limited to the illustrated shape in FIG. 5(a), and appropriate structure in which tensile stress is alleviated can be adopted.

The central wiring portion 23 includes a cavity 23a, although it is not necessary to include this cavity 23a. The cavity 23a is a region including the center of the axial direction that is the rotation center of the rotor 5 in the ultrasonic motor 1.

In order to rotate the rotor 5, a traveling wave traveling in the circumferential direction is generated in the vibrator 6. In this case, the center of the axial direction of the vibrator 6 is a portion that is hardly displaced. On the other hand, in the first main surface 6a of the vibrator 6, the vicinity of the outer peripheral edge and regions where the first to fourth piezoelectric elements 11 to 14 are provided are greatly displaced.

In the ultrasonic motor 1, as described above, the wiring member 15 is fixed to the first main surface 6a at the central wiring portion 23 that is hardly displaced in a state where a traveling wave is generated. The extended wiring portion 24 is lifted from the first main surface 6a. Therefore, although the vibrator 6 is repeatedly vibrated to generate a traveling wave when driven, disconnection and noise in the wiring member 15 hardly occur.

In addition, since the central wiring portion 23 is fixed to a portion where vibration hardly occurs, the vibration hardly leaks. Therefore, vibration of the stator 4 can be stabilized, and deterioration of the motor characteristics hardly occurs.

Next, a method used for driving the ultrasonic motor 1 will be described.

Figure 7:
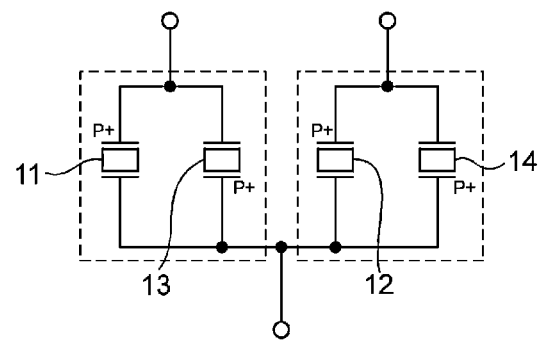
FIG. 7 is a circuit diagram used for describing a circuit for applying a drive signal to the piezoelectric elements according to the first exemplary embodiment.

In operation of a drive circuit illustrated in FIG. 7, the first and second signals are applied to the first and third piezoelectric elements 11 and 13 and the second and fourth piezoelectric elements 12 and 14, respectively.

Note that, a structure in which the plurality of the piezoelectric elements is dispersedly arranged in the circumferential direction and driven to generate a traveling wave in the stator is disclosed in, for example, WO 2010/061508 A1. The structure in which a traveling wave is generated is not limited to the following description, and the configuration described in WO 2010/061508 A1 is incorporated by reference in the present disclosure, and thus the detailed description is omitted.

Figure 8:
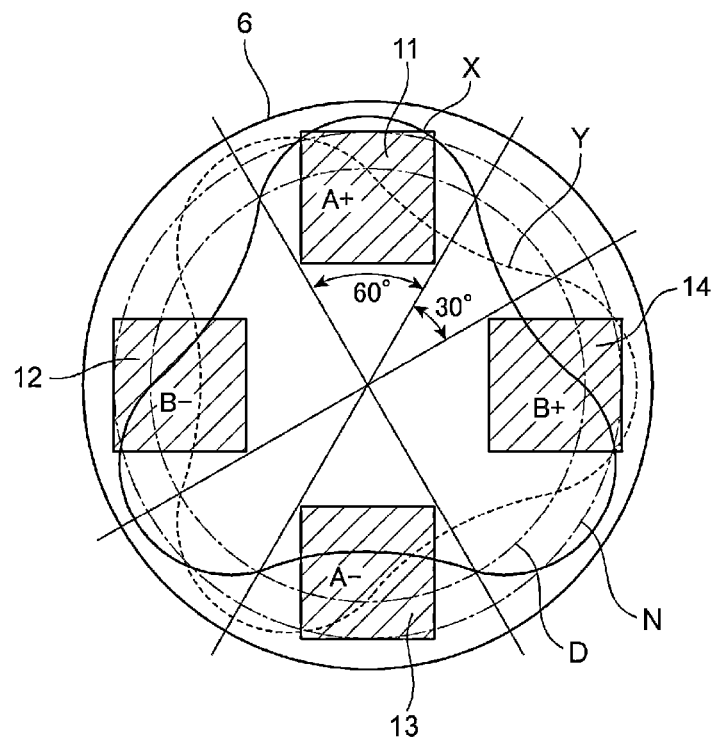
FIG. 8 is a bottom view of the stator used for describing a traveling wave that is excited according to the first exemplary embodiment.
Figure 9:
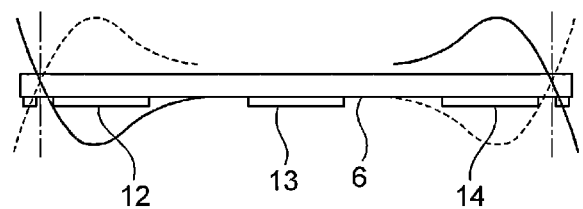
FIG. 9 is a schematic front view of the stator used for describing a traveling wave that is excited according to the first exemplary embodiment.

FIG. 8 is a bottom view used for describing the above traveling wave in an easily understandable manner, and FIG. 9 is a schematic front view of the stator. Here, three-wave standing waves X and Y are illustrated. It is assumed that the first to fourth piezoelectric elements 11 to 14 are arranged such that they are separated at intervals of a central angle of 30°. Each of the first to fourth piezoelectric elements 11 to 14 has a dimension in the circumferential direction that occupies a center angle of 60°. In this case, since the three-wave standing waves X and Y are excited, a central angle with respect to the wavelength of a traveling wave is 120°. That is, the first to fourth piezoelectric elements 11 to 14 has dimensions in the circumferential direction that face a central angle of 120°/2=60°. Adjacent piezoelectric elements are separated at intervals that correspond to a central angle of 120°/4=30°. In this case, as described above, the three-wave standing waves X and Y that are out of phase with each other by 90° are excited, and the three-wave standing waves X and Y are combined to generate a traveling wave.

In FIG. 8, "A+", "A−", "B+", and "B−" indicate polarization directions of the piezoelectric ceramic layers 16. Moreover, the "+" indicates that the piezoelectric ceramic layers are direction-polarized from the first main surface toward the second main surface in the thickness direction and the "−" indicates that the piezoelectric ceramic layers are polarized in the opposite direction.

"A" indicates the first piezoelectric element 11 and the third piezoelectric element 13, and "B" indicates the second piezoelectric element 12 and the fourth piezoelectric element 14.

Note that, although an example of a three-wave case has been described, the present invention is not limited thereto, and similarly, in a nine-wave case, two standing waves that are out of phase with each other by 90° are excited, and a traveling wave is generated by the two standing waves being combined.

By a traveling wave traveling in the circumferential direction being generated in the vibrator 6 as described above, the rotor 5 in pressure contact with the second main surface 6b of the vibrator 6 is rotated centering around the axial direction.

It is also noted that in the exemplary embodiment, the configuration in which a traveling wave is generated is not limited to the configuration illustrated in FIG. 8, and various conventionally known configurations in which a traveling wave is generated can be used in alternative aspects.

Returning to FIG. 2, the rotor 5 includes a disk-shaped rotor body 5a and a rotating shaft 5b including one end connected to the rotor body 5a. The rotating shaft 5b extends toward the side opposite to the stator 4 and is aligned with the center of the axial direction. The rotor body 5a is rotated, and the rotating shaft 5b is rotated accordingly.

In FIG. 2, the friction material 5c is fixed to the lower surface of the rotor body 5a of the rotor 5, and is provided for increasing frictional force between the rotor 5 and the vibrator 6. As the friction material 5c, for example, polytetrafluoroethylene (PTFE) liner material or the like can be used.

A cross-shaped recessed portion 2a is provided on the upper surface of the first case member 2. A pressure spring 8 is provided as a pressure applying member between the first main surface 6a of the vibrator 6 and the first case member 2. In this aspect, the pressure spring 8 has a cross shape in plan view, and the tips of the cross portion are fitted to the cross-shaped portion of the recessed portion 2a. Accordingly, the pressure spring 8 is not rotated centering around the axial direction, and the center of the axis and the center of the pressure spring 8 are aligned with each other. In order to fit the stator 4 and the pressure spring 8 to each other and prevent the stator 4 and the pressure spring 8 from being rotated, an elongated hole is formed at an upper portion of the pressure spring 8, and a protruding portion on the rear surface of the stator 4 is formed to be inserted in the elongated hole.

The pressure spring 8 applies pressure to bring the vibrator 6 into pressure contact with the rotor 5. In order to apply this pressure, the first case member 2 is fixed to the second case member 3, and the above pressure is applied using resilient force of the pressure spring 8.

For fixing the first case member 2 and the second case member 3 to each other, for example, appropriate fixing structure such as a method in which a bolt inserted through a through hole 2b and a through hole 3c and a nut are used can be used in an exemplary aspect. As the material of the first case member 2 and the second case member 3, for example, metal such as aluminum or stainless steel, or resin such as polybutylene terephthalate (PBT) or polyphenylene sulfite (PPS) can be used.

A cylindrical protruding portion 3a including a through hole 3b is provided at the center of the second case member 3. A bearing 7 is housed in the through hole 3b, and the rotating shaft 5b is inserted through a through hole of the bearing 7. Although the bearing 7 is used in the present embodiment, another shaft bearing such as a sliding shaft bearing may be used.

Figure 10:
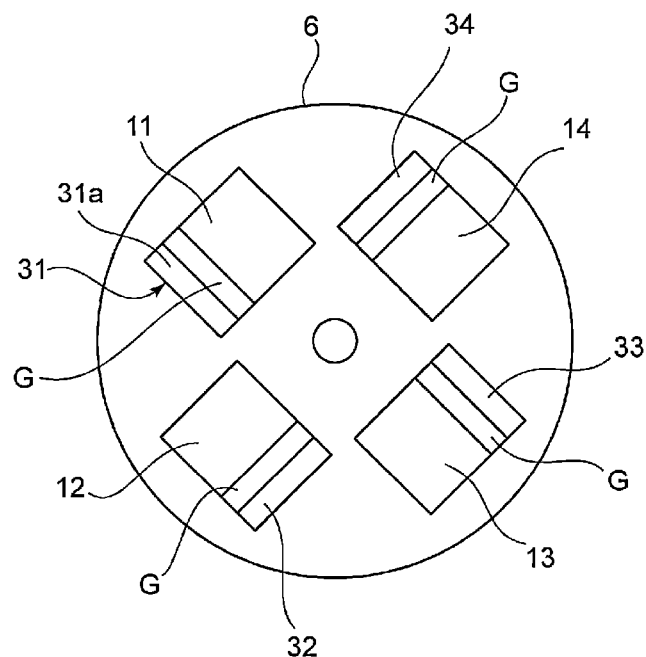
FIG. 10 is a bottom view used for describing a stator in an ultrasonic motor according to a second exemplary embodiment.
Figure 11:
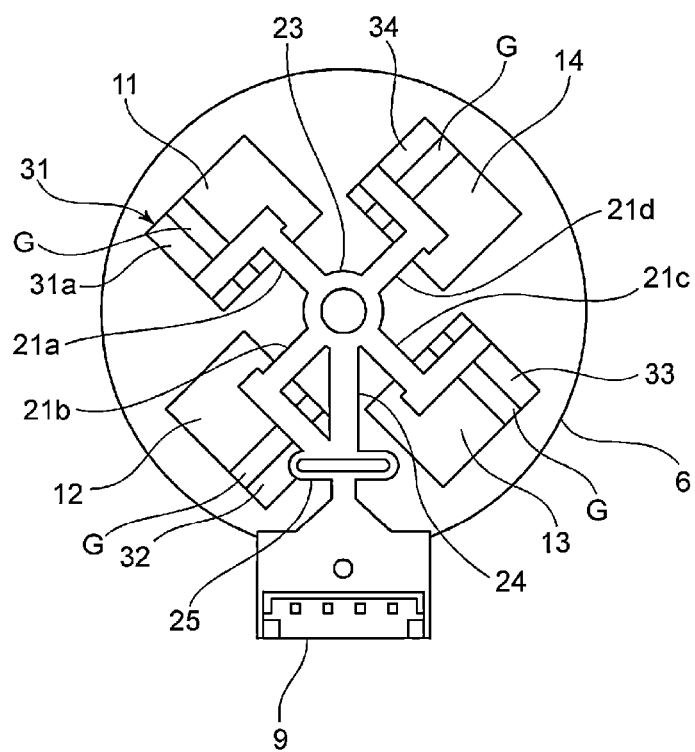
FIG. 11 is a bottom view used for describing the stator and a wiring member in the ultrasonic motor according to the second exemplary embodiment.

FIG. 10 is a bottom view used for describing structure in which a vibrator 6 and first to fourth piezoelectric elements 11 to 14 are attached in an ultrasonic motor according to a second exemplary embodiment, and FIG. 11 is a bottom view illustrating structure in which a wiring member 15 is further attached to the first to fourth piezoelectric elements 11 to 14.

In the ultrasonic motor of the second embodiment, first to fourth detection elements 31 to 34 are provided integrally with the first to fourth piezoelectric elements 11 to 14. That is, on the outer surfaces of piezoelectric ceramic layers 16, electrodes for forming the first to fourth detection elements 31 to 34 are provided being separated from one sides of electrodes of the first to fourth piezoelectric elements 11 to 14 by gaps G. Taking the first detection element 31 as an example, the electrode for detection is an electrode 31a positioned on the outer side of a piezoelectric ceramic layer 16. A first main surface 6a side of the vibrator 6 is ground potential. A detection unit that detects vibration of the piezoelectric ceramic layer 16 between the electrode on the ground potential side and the electrode 31a is provided. The second to fourth detection elements 32 to 34 are formed similarly.

The wiring member 15 also includes signal wiring through which electric signals detected from the above first to fourth detection elements 31 to 34 flow.

Figure 12:
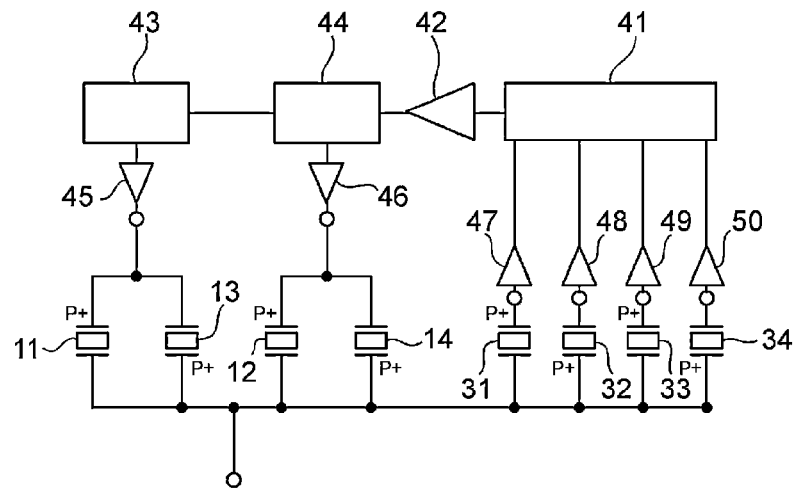
FIG. 12 is a circuit diagram used for describing a drive circuit of the ultrasonic motor according to the second exemplary embodiment.

FIG. 12 is a circuit diagram used for describing a drive circuit of the ultrasonic motor including such first to fourth detection elements 31 to 34. Here, a drive signal is output from a control device 41 via an amplifier 42. Then, signals having phases that have been adjusted by a first phase circuit 43 and a second phase circuit 44 are provided to the first and third piezoelectric elements 11 and 13 and the second and fourth piezoelectric elements 12 and 14, respectively. Thus, the vibrator 6 is driven.

As further shown, an amplifier 45 is connected between the first phase circuit 43 and the first and third piezoelectric elements 11 and 13. Similarly, an amplifier 46 is connected between the second phase circuit 44 and the second and fourth piezoelectric elements 12 and 14.

On the other hand, signals extracted by the first to fourth detection elements 31 to 34 are amplified by amplifiers 47 to 50 and supplied to the control device 41. The control device 41 adjusts the voltage of a drive signal for driving the first to fourth piezoelectric elements 11 to 14 on the basis of the detected signals that correspond to the actual excitation state. In this manner, the drive of the ultrasonic motor can be stabilized.

Figure 13:
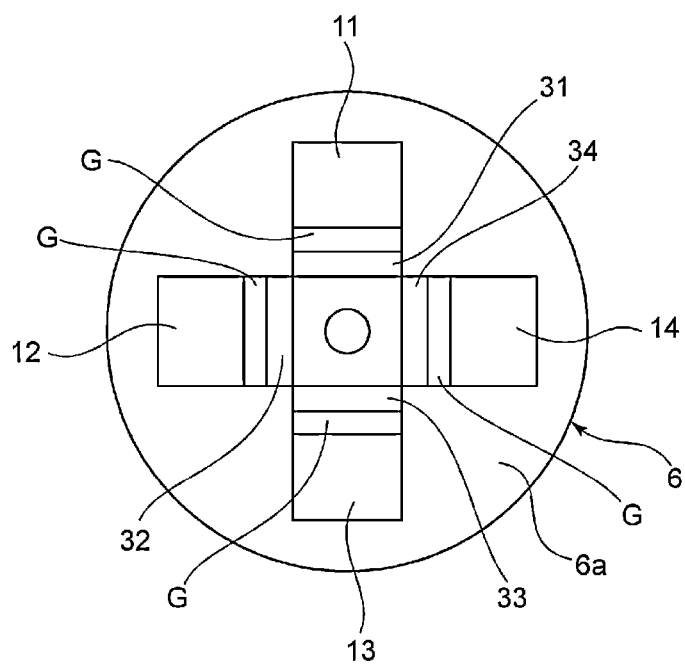
FIG. 13 is a bottom view used for describing a stator in an ultrasonic motor according to a third exemplary embodiment.

FIG. 13 is a bottom view used for describing structure of first to fourth piezoelectric elements 11 to 14, first to fourth detection elements 31 to 34, and a vibrator 6 of an ultrasonic motor according to a third exemplary embodiment.

As illustrated in FIG. 13, the first to fourth detection elements 31 to 34 can be provided such that the first to fourth detection elements 31 to 34 are positioned on the rotation center side.

Figure 14:
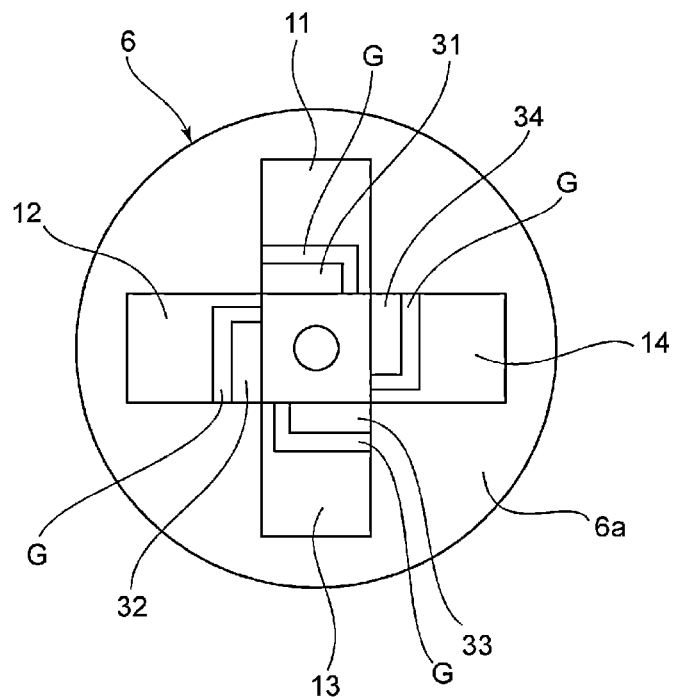
FIG. 14 is a bottom view used for describing a stator in an ultrasonic motor according to a fourth exemplary embodiment.

FIG. 14 is a bottom view used for describing structure of first to fourth piezoelectric elements 11 to 14, first to fourth detection elements 31 to 34, and a vibrator 6 of an ultrasonic motor according to a fourth exemplary embodiment.

As illustrated in FIG. 14, the first to fourth detection elements 31 to 34 may be separated from the first to fourth piezoelectric elements 11 to 14 by L-shaped gaps G.

As described above, in the first embodiment illustrated in FIG. 2, the protruding portion on the rear surface of the stator 4 is fitted in the elongated hole of the pressure spring 8. Although not illustrated, the protruding portion is provided on the first main surface 6a of the vibrator 6 of the stator 4. The protruding portion has a substantially elliptical columnar shape. As a result, the elongated hole of the pressure spring 8 abuts on the protruding portion of the vibrator 6 in the rotation direction. Accordingly, positional deviation between the pressure spring 8 and the vibrator 6 due to the rotation can be effectively reduced or prevented. Hereinafter, further effect of the pressure spring 8 will be described.

Figure 15A:
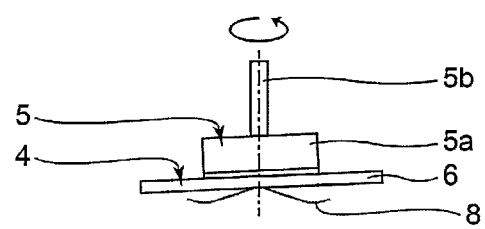
FIGS. 15(a) to 15(c) are schematic front views used for describing effect of a pressure spring.
Figure 15B:
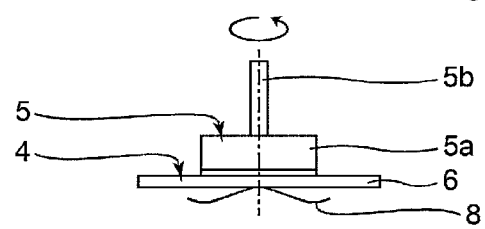
Figure 15C:
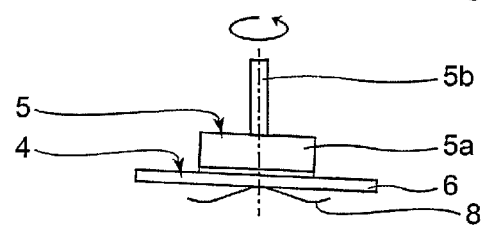

FIGS. 15(a) to 15(c) are schematic front views used for describing the effect of the pressure spring.

Realistically, variation of the positional relation between the rotor body 5a and the rotating shaft 5b of the rotor 5 illustrated in FIG. 15(a) can occur in the process of manufacturing. Moreover, when the rotor body 5a and the rotating shaft 5b are not integrated but the rotating shaft 5b is inserted into the rotor body 5a, there is a possibility that the positional relation between the rotor body 5a and the rotating shaft 5b is misaligned. In such a case, as illustrated in FIGS. 15(a) to 15(c), the rotation of the rotor 5 tends to be wobbled. Although the rotational wobbling may be within an allowable range, the rotational speed can be unstable as the rotation is wobbled.

On the other hand, in the first embodiment, the positional deviation between the pressure spring 8 and the vibrator 6 due to the rotation can be effectively reduced or prevented. As a result, although the rotation may be wobbled, pressure applied to the stator 4 and the rotor 5 by the pressure spring 8 can be stabilized. Therefore, the rotational speed of the ultrasonic motor 1 can be more reliably stabilized.

Hereinafter, fifth to seventh embodiments will be described in which configuration of a vibrator in a pressure spring or a stator is different from that of the first exemplary embodiment. It is noted that in the following drawings, a wiring member, each piezoelectric element, and the like may be omitted for ease of describing the exemplary embodiments.

Figure 16:
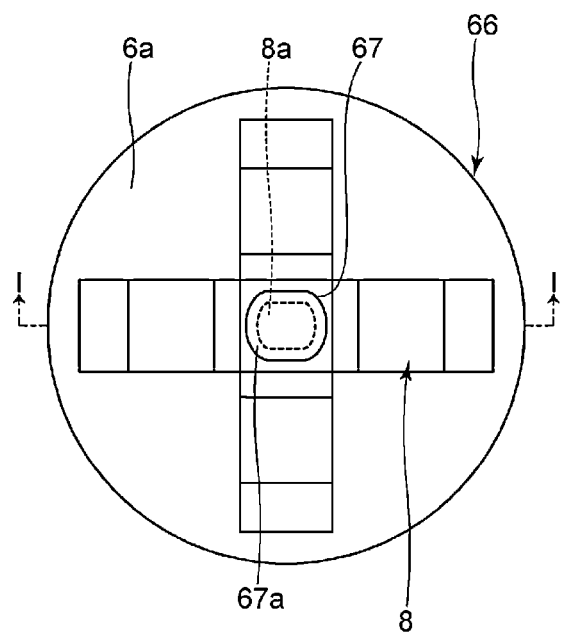
FIG. 16 is a bottom view illustrating configurations of a pressure spring and a vibrator in a stator according to a fifth exemplary embodiment.
Figure 17:
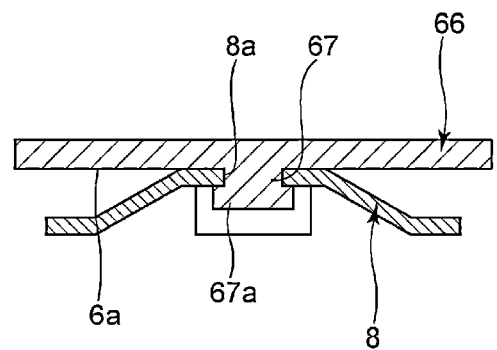
FIG. 17 is a sectional view taken along line I-I in FIG. 16.

FIG. 16 is a bottom view illustrating configurations of a pressure spring and a vibrator in a stator according to the fifth exemplary embodiment. FIG. 17 is a sectional view taken along line I-I in FIG. 16.

As illustrated in FIGS. 16 and 17, the present embodiment is different from the first embodiment in that a protruding portion 67 of a vibrator 66 includes a fixing portion 67*a*. Other than the above point, an ultrasonic motor of the present embodiment has a similar configuration to the ultrasonic motor 1 of the first embodiment described above.

The protruding portion 67 is provided on a first main surface 6*a* of the vibrator 66. The fixing portion 67*a* is provided at the tip of the protruding portion 67. The sectional area of the fixing portion 67*a* of the protruding portion 67 is larger than the sectional area of other portions. The sectional area of the protruding portion 67 is an area of a section parallel to the first main surface 6*a* of the vibrator 66.

As illustrated in FIG. 17, the protruding portion 67 is fitted in an elongated hole 8*a* of a pressure spring 8. In addition, the pressure spring 8 is interposed between the first main surface 6*a* of the vibrator 66 and the fixing portion 67*a*. As a result, the pressure spring 8 can be more reliably fixed, and the positional deviation between the vibrator 66 and the pressure spring 8 due to the rotation can be more reliably reduced or prevented.

Figure 18A:
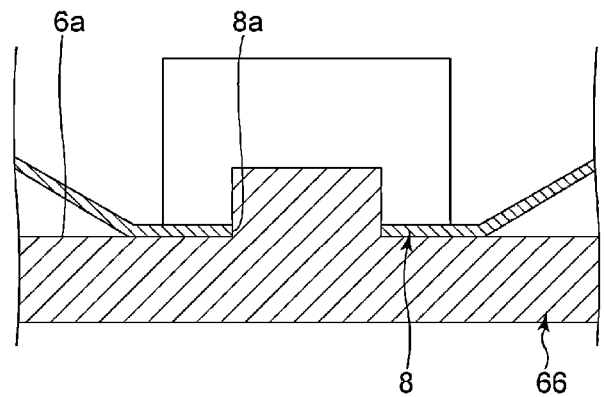
FIGS. 18(a) and 18(b) are schematic sectional views used for describing an example of a method of forming a fixing portion.
Figure 18B:
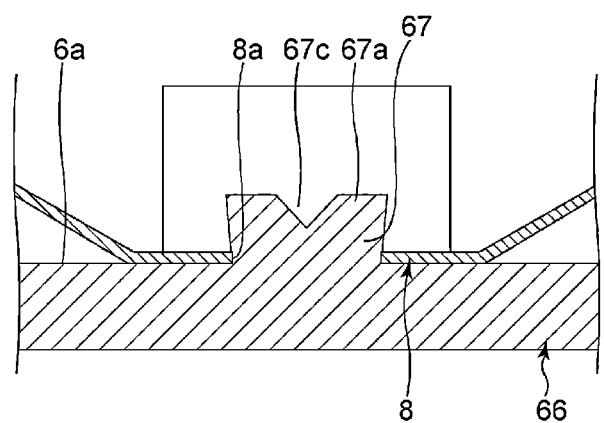

FIGS. 18(*a*) and 18(*b*) are schematic sectional views used for describing an example of a method of forming the fixing portion.

As illustrated in FIG. 18(*a*), the protruding portion similar to that of the first embodiment is fitted in the elongated hole 8*a*. Next, as illustrated in FIG. 18(*b*), the tip of the protruding portion 67 is punched. As a result, the protruding portion 67 is deformed, and the width of the protruding portion 67 increases, and accordingly, the fixing portion 67*a* is formed. In a case illustrated in FIG. 18(*b*), a recessed portion 67*c* is formed in the fixing portion 67*a*. However, the protruding portion may be deformed by a method other than the above method to form the fixing portion 67*a*. It is noted that the fixing portion 67*a* can be provided without the recessed portion 67*c* formed, for example, by pressure being applied using a jig other than a punch.

Figure 19:
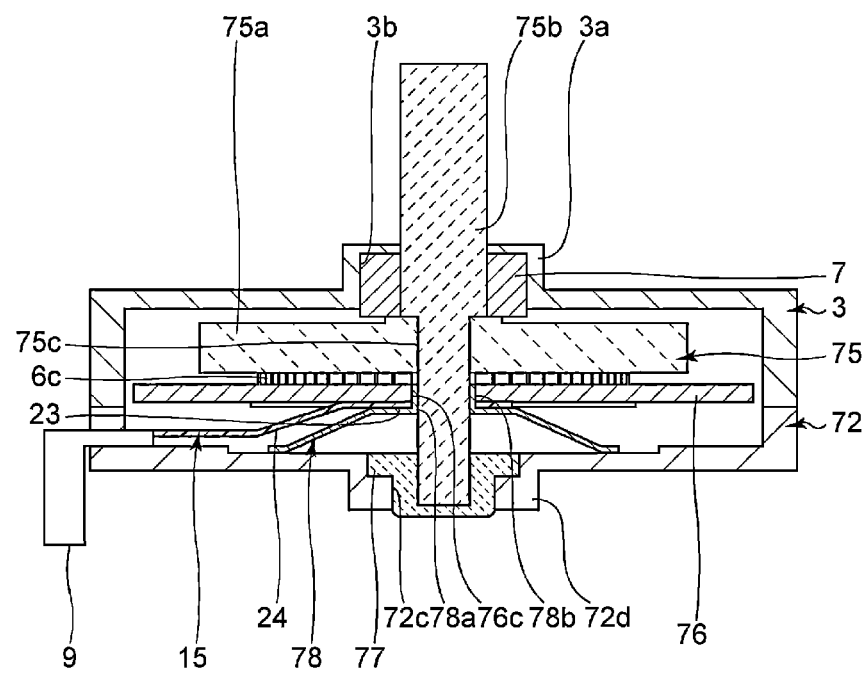
FIG. 19 is a front sectional view of a vibrating device according to a sixth exemplary embodiment.

FIG. 19 is a front sectional view of a vibrating device according to the sixth exemplary embodiment.

As illustrated in FIG. 19, the present embodiment is different from the first embodiment in configurations of a first case member 72, a rotor 75, a vibrator 76, and a pressure spring 78. Other than the above points, an ultrasonic motor of the present embodiment has a similar configuration to the ultrasonic motor 1 of the first embodiment described above.

In this embodiment, the outer shape of the rotor body 75*a* of the rotor 75 is a disk shape as in the first embodiment. In the present embodiment, the rotor body 75*a* includes a through hole 75*c* that is positioned in the center of the rotor body 75*a*. A rotating shaft 75*b* is inserted through the through hole 75*c*. However, the position of the through hole 75*c* is not limited to the above. The through hole 75*c* can be positioned in a region including the center of the axial direction.

A through hole 76*c* is provided in the center of the vibrator 76. However, the position of the through hole 76*c* is not limited to the above. The through hole 76*c* is only required to be positioned in a region including the center of the axial direction.

Figure 20:
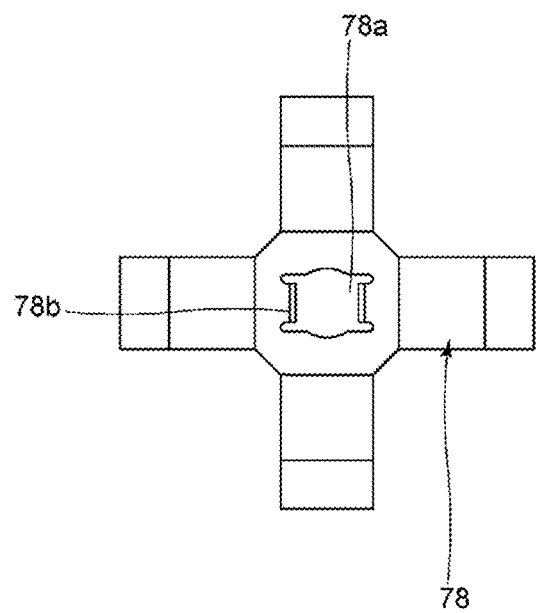
FIG. 20 is a plan view of a pressure spring according to the sixth exemplary embodiment.
Figure 21:
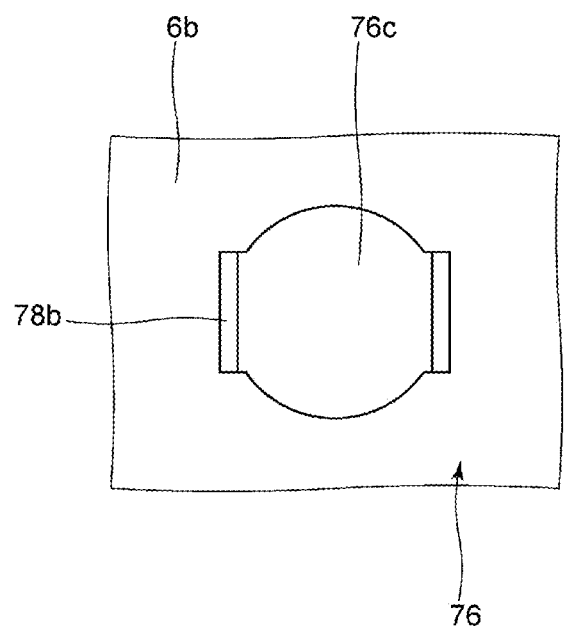
FIG. 21 is a plan view illustrating configurations of the pressure spring and a vibrator according to the sixth exemplary embodiment.

FIG. 20 is a plan view of the pressure spring according to the sixth exemplary embodiment. FIG. 21 is a plan view illustrating configurations of the pressure spring and the vibrator according to the sixth embodiment.

As illustrated in FIG. 20, the pressure spring 78 of the present embodiment is different from that of the first embodiment in the shape of a hole 78*a* and in that claw portions 78*b* are provided. Other than the above points, the configuration of the pressure spring 78 is similar to that of the pressure spring 8 of the first embodiment as described above.

As shown, a pair of the claw portions 78*b* is provided in parts of portions of the pressure spring 78 in contact with the hole 78*a*. The pair of the claw portions 78*b* extends toward a stator side. The pair of the claw portions 78*b* faces each other across the hole 78*a*. However, the claw portions 78*b* are not limited to one pair.

Figure 22:
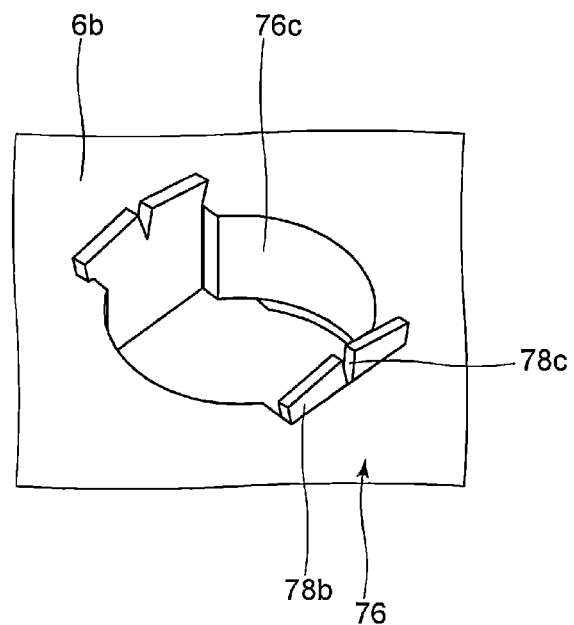
FIG. 22 is a perspective view illustrating an example of a mode in which claw portions of the pressure spring are fixed to the vibrator in the sixth exemplary embodiment.

As illustrated in FIGS. 19 and 21, the claw portions 78*b* are fitted in the through hole 76*c* of the vibrator 76. The tips of the claw portions 78*b* are welded to the vibrator 76. However, the claw portions 78*b* can be fixed to the vibrator 76 using a method other than welding in alternative aspects. For example, as illustrated in FIG. 22, the claw portions 78*b* can be fixed to the vibrator 76 by being crimped. In a case of fixing by crimping, for example, after the claw portions 78*b* are fitted into the through hole 76*c* of the vibrator 76, the tips of the claw portions 78*b* may be punched using a flat punch or the like. In the case illustrated in FIG. 22, groove portions 78*c* are formed at the tips of the claw portions 78*b*. It is noted that the exemplary embodiment is not limited thereto, and the claw portions 78*b* may be deformed by a method other than the above.

It is also noted that at least one pair of the claw portions 78*b* is preferably provided in the exemplary aspect. Accordingly, the pressure spring 78 can be stably fixed to the vibrator 76. However, for example, 0.5 pairs or 2.5 pairs of the claw portions 78*b* can be provided at an odd number of position(s).

Returning to FIG. 19, the rotating shaft 75*b* is inserted through the through hole 76*c* of the vibrator 76 and the hole 78*a* of the pressure spring 78. More specifically, in a state where the claw portions 78*b* are fitted in the through hole 76*c*, the pair of the claw portions 78*b* faces each other across a substantially cylindrical portion of the through hole 76*c*. The rotating shaft 75*b* passes between the pair of claw portions 78*b*.

A cylindrical protruding portion 72*d* including a through hole 72*c* is provided at the center of the first case member 72. A shaft bearing 77 is housed in the through hole 72*c*. The vicinity of the end of the rotating shaft 75*b* abuts on the shaft bearing 77. In the present embodiment, the shaft bearing 77 is a sliding shaft bearing. However, the shaft bearing 77 may be another shaft bearing such as a bearing.

In the present embodiment, the rotating shaft 75*b* is supported on both the first case member 72 side and the second case member 3 side. As a result, the exemplary embodiment is constructed to cope with various types of motor structure.

A recessed portion 2*a* similar to that of the first embodiment is provided on the inner wall of a portion of the first case member 72 in a case. The pressure spring 78 is positioned between the inner wall and the stator. The pressure spring 78 is fitted in the recessed portion 2*a*. Furthermore, the claw portions 78*b* of the pressure spring 78 are fitted in the through hole 76*c* of the vibrator 76 and fixed to the vibrator 76. Accordingly, positional deviation between the pressure spring 78 and the vibrator 76 due to the rotation can be effectively reduced or prevented. Therefore, pressure applied to the vibrator 76 and the rotor 75 by the pressure spring 78 can be stabilized, and the rotation speed in the ultrasonic motor can be more reliably stabilized.

In addition, also in the present embodiment, a wiring member 15 is provided similarly to the first embodiment. More specifically, a central wiring portion 23 is fixed to the vibrator 76, and an extended wiring portion 24 is lifted from the vibrator 76. As a result, disconnection and noise in the wiring member 15 hardly occur, the stability of vibration of the stator is enhanced, and the characteristics of a motor are hardly deteriorated.

Figure 23:
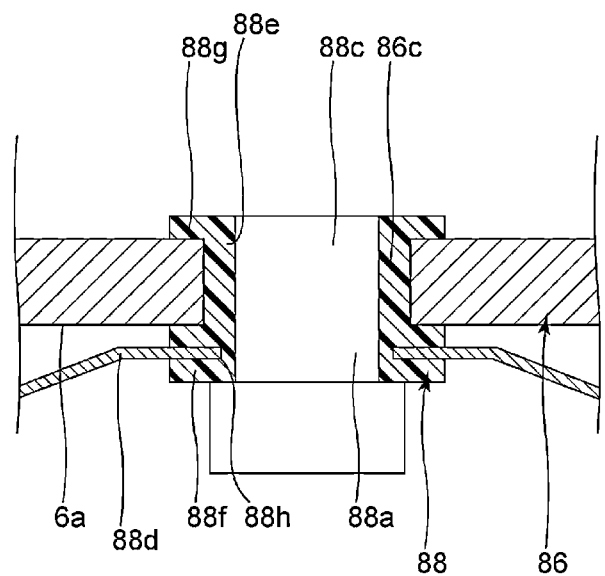
FIG. 23 is a front sectional view illustrating configurations of a pressure spring and a vibrator according to a seventh exemplary embodiment.
Figure 24:
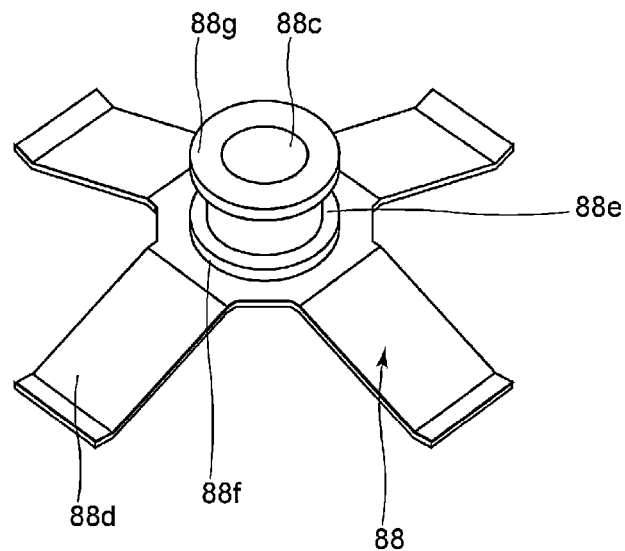
FIG. 24 is a perspective view illustrating a configuration of the pressure spring according to the seventh exemplary embodiment.

FIG. 23 is a front sectional view illustrating configurations of a pressure spring and a vibrator according to the seventh exemplary embodiment. FIG. 24 is a perspective view illustrating a configuration of the pressure spring according to the seventh exemplary embodiment.

As illustrated in FIGS. 23 and 24, the present embodiment is different from the sixth embodiment in configurations of a pressure spring 88 and a vibrator 86. Other than the above points, an ultrasonic motor of the present embodiment has a similar configuration to the ultrasonic motor of the sixth embodiment described above.

As shown, the pressure spring 88 includes a leaf spring portion 88*d* and a fitting portion 88*e*. The leaf spring portion 88*d* is formed from metal. The fitting portion 88*e* is formed from resin. The leaf spring portion 88*d* is fixed to the fitting portion 88*e*. More specifically, the pressure spring 88 is an insert-molded body including the leaf spring portion 88*d* and the fitting portion 88*e*. As illustrated in FIG. 23, the fitting portion 88*e* of the pressure spring 88 and the vibrator 86 are fitted to each other. Hereinafter, the configurations of the pressure spring 88 and the vibrator 86 will be described in detail.

The leaf spring portion 88*d* is formed similarly to the pressure spring 8 of the first embodiment except for the shape of a hole 88*a*. The cavity of the hole 88*a* is circular. However, it is noted that the shape of the hole 88*a* is not limited to the above.

The fitting portion 88*e* has a substantially cylindrical shape. The fitting portion 88*e* includes a through hole 88*c*, a first fixing portion 88*f*, and a second fixing portion 88*g*. The first fixing portion 88*f* is positioned at one end of the fitting portion 88*e* and the second fixing portion 88*g* is positioned at the other end of the fitting portion 88*e*. More specifically, the first fixing portion 88*f* is positioned at the end of the fitting portion 88*e* on the first case member side. The second fixing portion 88*g* is positioned at the end of the fitting portion 88*e* on the rotor 75 side. The outer diameters of the first fixing portion 88*f* and the second fixing portion 88*g* are larger than the outer diameter of a portion between the first fixing portion 88*f* and the second fixing portion 88*g*. As illustrated in FIG. 23, a groove portion 88*h* is provided in the circumferential direction on the radially outer wall of the first fixing portion 88*f*. The first fixing portion 88*f* is fitted to the leaf spring portion 88*d* at the groove portion 88*h*.

The vibrator 86 is formed similarly to the vibrator 76 of the sixth embodiment except for the shape of a through hole 86*c*. The cavity of the through hole 86*c* is circular. The vicinity of the through hole 86*c* of the vibrator 86 the fitting portion 88*e* of the pressure spring 88 are fitted to each other. More specifically, the fitting portion 88*e* is inserted through the through hole 86*c*. Furthermore, the vibrator 86 is interposed between the first fixing portion 88*f* and the second fixing portion 88*g* of the fitting portion 88*e*.

Figure 25:
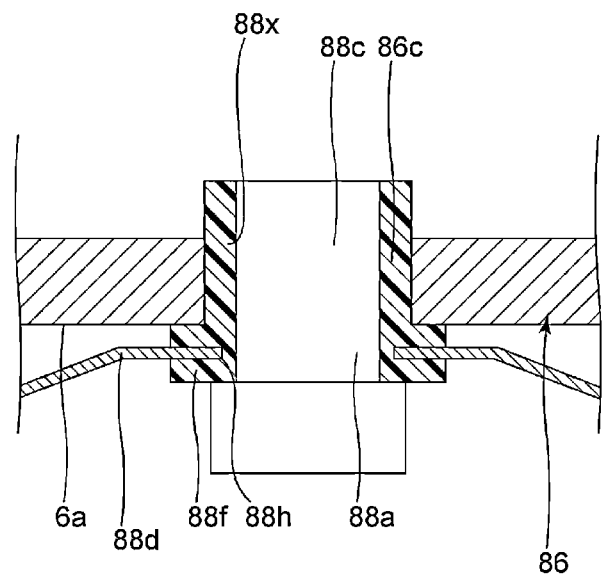
FIG. 25 is a front sectional view illustrating an example of a method of fitting the pressure spring and the vibrator to each other according to the seventh exemplary embodiment.

The second fixing portion 88*g* of the present embodiment is formed when the vibrator 86 and the pressure spring 88 are fitted to each other. More specifically, as illustrated in FIG. 25, a fitting portion 88*x* formed from resin is inserted through the through hole 86*c* of the vibrator 86. Thereafter, the distal end portion of the fitting portion 88*x* is heated. Accordingly, the distal end portion of the fitting portion 88*x* is deformed to form the second fixing portion 88*g*.

Although not illustrated, it should be noted that a rotating shaft 75*b* similar to that of the sixth embodiment is inserted through the fitting portion 88*e* of the pressure spring 88. Furthermore, the rotating shaft 75*b* is supported on the both sides. As a result, the exemplary embodiment is constructed to cope with various types of motor structure.

In addition, also in the present embodiment, a wiring member 15 is provided similarly to the first embodiment. As a result, disconnection and noise in the wiring member 15 hardly occur, the stability of vibration of the stator is enhanced, and the characteristics of a motor do not deteriorate or only minimally deteriorate.

As described in each of the above embodiments, the ultrasonic motor preferably includes a pressure spring fitted to a portion of a stator including the center of the axial direction. More preferably, the ultrasonic motor includes a case that houses at least a part of a rotor, the stator, and the pressure spring, the pressure spring is positioned between the inner wall of the case and the stator, a recessed portion is provided on the inner wall of the case, and the recessed portion and the pressure spring are fitted to each other.

As illustrated in FIG. 17, preferably, the vibrator 66 of the stator includes the protruding portion 67 provided on the first main surface 6*a*, the protruding portion 67 includes the fixing portion 67*a* having a width wider than other portions, and the pressure spring 8 is interposed between the fixing portion 67*a* and the first main surface 6*a*.

Alternatively, as illustrated in FIG. 19, preferably, the vibrator 76 of the stator includes the through hole 76*c*, the pressure spring 78 includes the claw portions 78*b* that extend toward the stator side, and the claw portions 78*b* are fitted in the through hole 76*c*. More preferably, at least one pair of the claw portions 78*b* is provided. The pressure spring 78 can include the hole 78*a*, and at least one pair of the claw portions 78*b* may face each other across the hole 78*a*.

In addition, as illustrated in FIG. 23, preferably, the vibrator 86 of the stator includes the through hole 86*c*, the pressure spring 88 includes the fitting portion 88*e* and the leaf spring portion 88*d* fixed to the fitting portion 88*e*, and the fitting portion 88*e* of the pressure spring 88 and the vibrator 86 of the stator are fitted to each other. More preferably, the fitting portion 88*e* of the pressure spring 88 is formed from resin in an exemplary aspect.

As in the sixth and seventh embodiments, the rotating shaft of the rotor can be inserted through the vibrator and the pressure spring of the stator. Preferably, the ultrasonic motor includes the rotor body of the rotor, the stator, and a pair of shaft bearings provided such that the pressure spring is interposed therebetween, and the rotating shaft of the rotor is held by the pair of the shaft bearings.

DESCRIPTION OF REFERENCE SYMBOLS

1: Ultrasonic motor
2: First case member
2a: Recessed portion
2b: Through hole
3: Second case member
3a: Cylindrical protruding portion
3b: Through hole
3c: Through hole
4: Stator
5: Rotor
5a: Rotor body
5b: Rotating shaft
5c: Friction material
6: Vibrator
6a, 6b: First and second main surfaces
6c: Protrusion
7: Bearing
8: Pressure spring
8a: Elongated hole
9: Connector
11, 12, 13, 14: First, second, third, and fourth piezoelectric elements
15: Wiring member
16: Piezoelectric ceramic layer
17, 18: Electrode
21a, 21b, 21c, 21d: First, second, third, and fourth connection members
23: Central wiring portion
23a: Cavity
24: Extended wiring portion
25: Stress absorbing portion
25a: Through hole
31, 32, 33, 34: First, second, third, and fourth detection elements
31a: Electrode
41: Control device
42, 45, 46, 47, 48, 49, 50: Amplifier
43, 44: First and second phase circuits
66: Vibrator
67: Protruding portion
67a: Fixing portion
67c: Recessed portion
72: First case member
72c: Through hole
72d: Cylindrical protruding portion
75: Rotor
75a: Rotor body
75b: Rotating shaft
75c: Through hole
76: Vibrator
76c: Through hole
77: Shaft bearing
78: Pressure spring
78a: Hole
78b: Claw portion
78c: Groove portion
86: Vibrator
86c: Through hole
88: Pressure spring
88a: Hole
88c: Through hole
88d: Leaf spring portion
88e: Fitting portion
88f, 88g: First and second fixing portions
88h: Groove portion
88x: Fitting portion

The invention claimed is:

1. An ultrasonic motor comprising:
a stator that includes a vibrator having first and second main surfaces that oppose each other, and first and second piezoelectric elements disposed on the first main surface of the vibrator;
a rotor directly or indirectly in contact with the second main surface of the vibrator; and
a wiring member connected to the first and second piezoelectric elements,
wherein the first and second piezoelectric elements are arranged along a circumferential direction of a traveling wave that circulates an axial direction of the vibrator so that the traveling wave is generated by the vibrator during vibration,
wherein the wiring member includes:
a first connection member and a second connection member connected to the first and second piezoelectric elements, respectively,
a central wiring portion connected to the first connection member and the second connection member and provided in a region including a center of the axial direction of the vibrator, and
an extended wiring portion connected to the central wiring portion, and
wherein the central wiring portion is fixed to the first main surface of the vibrator, and the extended wiring portion is lifted from the first main surface of the vibrator.

2. The ultrasonic motor according to claim 1, wherein the vibrator is a metal plate that is disk shaped.

3. The ultrasonic motor according to claim 1, wherein the axial direction of the vibrator is a direction that connects the first main surface to the second main surface of the vibrator and that extends along a rotation center thereof.

4. The ultrasonic motor according to claim 1, wherein:
the wiring member includes first signal wiring electrically connected to the first piezoelectric element and second signal wiring electrically connected to the second piezoelectric element, and
the first signal wiring passes through the first connection member, the central wiring portion, and the extended wiring portion, and the second signal wiring passes through the second connection member, the central wiring portion, and the extended wiring portion.

5. The ultrasonic motor according to claim 1, wherein the central wiring portion comprises a cavity including the center of the axial direction.

6. The ultrasonic motor according to claim 1, wherein the first and second connection members extend from the central wiring portion toward an outer peripheral edge of the vibrator.

7. The ultrasonic motor according to claim 1, further comprising at least one other piezoelectric element in addition to the first and second piezoelectric elements.

8. The ultrasonic motor according to claim 7, further comprising:
at least one additional connection member,
wherein the first and second connection members and the at least one additional connection member extend radially from the central wiring portion toward an outer peripheral edge of the vibrator.

9. The ultrasonic motor according to claim 1, further comprising a friction material fixed to a surface of the rotor that faces the second main surface of the vibrator.

10. The ultrasonic motor according to claim 1, further comprising a stress absorbing portion that is disposed in the extended wiring portion and that absorbs tensile stress applied to the extended wiring portion.

11. The ultrasonic motor according to claim 10, wherein the stress absorbing portion comprises a branched portion that extends in a direction perpendicular to a direction of the extended wiring portion.

12. The ultrasonic motor according to claim 11, wherein a through hole extends through the stress absorbing portion.

13. The ultrasonic motor according to claim 1, further comprising a rotating shaft that extends the rotor toward a side opposite to the stator and is aligned with the center of the axial direction.

14. The ultrasonic motor according to claim 1, further comprising a pressure applying member provided on the first main surface of the vibrator and configured to bring the vibrator into pressure contact with the rotor.

15. The ultrasonic motor according to claim 1, further comprising a first case member disposed on the first main surface of the vibrator, and a second case member disposed on a side of the rotor opposite to the stator, with the first case member being coupled to the second case member to define housing space that includes the stator and the rotor.

16. An ultrasonic motor comprising:
a stator that includes a vibrator having first and second surfaces that oppose each other, and at least a pair of piezoelectric elements disposed on the first surface of the vibrator;
a rotor coupled to second surface of the vibrator; and
a wiring member connected to the first and second piezoelectric elements, wherein the wiring member including: first and second connection members connected to first and second piezoelectric elements, respectively,
a central wiring portion connected to the first and second connection members and fixed to the first surface of the vibrator in a region that includes a center of an axial direction of the vibrator, and
an extended wiring portion that extends from the central wiring portion and that is lifted from the first main surface of the vibrator.

17. The ultrasonic motor according to claim 16, wherein the first and second piezoelectric elements are arranged along a circumferential direction of a traveling wave that circulates the axial direction of the vibrator so that the traveling wave is generated by the vibrator during vibration.

18. The ultrasonic motor according to claim 16, wherein the axial direction of the vibrator is a direction that connects the first surface to the second surface of the vibrator and that extends along a rotation center thereof.

19. The ultrasonic motor according to claim 16, further comprising a friction material fixed to a surface of the rotor that faces the second surface of the vibrator.

20. The ultrasonic motor according to claim 16, further comprising a stress absorbing portion that is disposed in the extended wiring portion and that absorbs tensile stress applied to the extended wiring portion.

* * * * *